United States Patent [19]

Whitesel

[11] Patent Number: 5,339,514
[45] Date of Patent: Aug. 23, 1994

[54] METHOD OF MANUFACTURING LAMINATED STATOR WITH IMPROVED FLUX PATTERN

[75] Inventor: J. Warren Whitesel, Lincolnwood, Ill.

[73] Assignee: Uppco Incorporated, Monticello, Ind.

[21] Appl. No.: 22,658

[22] Filed: Mar. 1, 1993

Related U.S. Application Data

[62] Division of Ser. No. 870,274, Apr. 17, 1992, Pat. No. 5,248,911.

[51] Int. Cl.$^5$ .............................................. H02K 15/02
[52] U.S. Cl. .................................... 29/596; 29/609; 310/42; 310/216
[58] Field of Search ........................ 29/596, 598, 609; 310/216, 217, 218, 257, 256, 258, 42, 89, 91

[56] References Cited

U.S. PATENT DOCUMENTS

| | | | |
|---|---|---|---|
| 4,361,953 | 12/1982 | Peachee | 29/596 |
| 4,883,997 | 11/1989 | DeCesare | 310/216 |
| 5,118,978 | 6/1992 | Matsumoto et al. | 310/216 |

Primary Examiner—Carl E. Hall
Attorney, Agent, or Firm—Laff, Whitesel, Conte & Saret

[57] ABSTRACT

A stator for a fractional horsepower motor has a mounting hole of reduced dimensions for fixing the position of motor mounting brackets which support a rotor. The configuration of the mounting holes increase the area where magnetic flux may pass. One configuration reduces the depth of the mounting hole to one or two laminates of each side of the stator. Another configuration is an elongated hole which lies in the direction of the magnetic flux. Each laminate may have a tang which interlocks with tangs on other laminates when the laminated stack is squeezed together in a punch press.

12 Claims, 1 Drawing Sheet

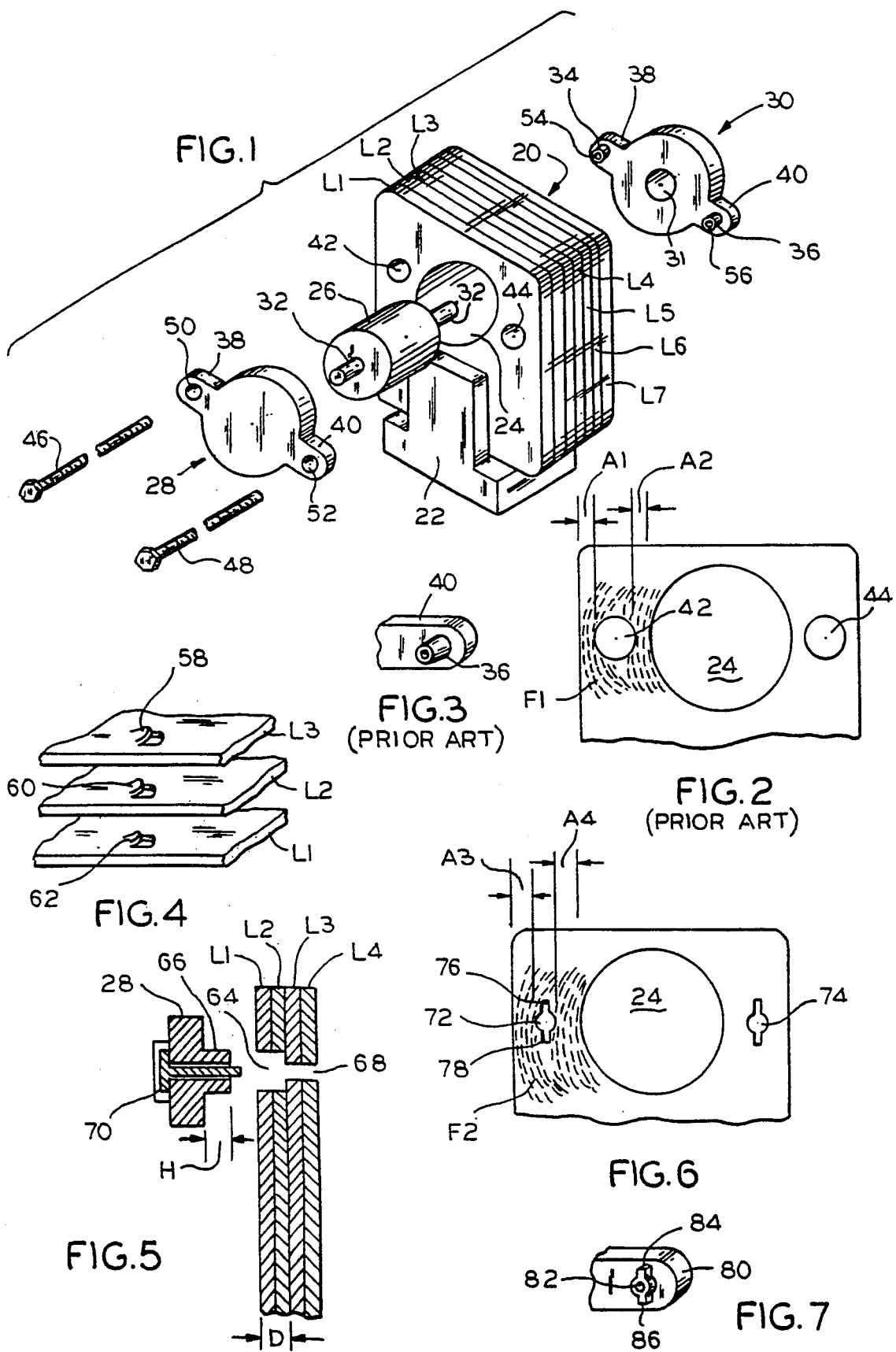

METHOD OF MANUFACTURING LAMINATED STATOR WITH IMPROVED FLUX PATTERN

This application is a division, of prior application Ser. No. 07/870,274 filed Apr. 17, 1992, now U.S. Pat. No. 5,248,911.

This invention relates to fractional horsepower electric motors and more particularly to stators having much greater operating efficiency especially—but not exclusively—for use in such motors.

Fractional horsepower motors are used in small appliances, toys, and other similar devices, which is a business field where cost is extremely important. Even the smallest savings may spell a difference between commercial success and failure. Also, the efficiency of the motor is important since most manufacturers of such appliances, toys, and the like wish to use the smallest motor which can reliably perform its function.

One of the factors which affects the efficiency of electric motors is the ability of the iron laminations used in the stator to carry magnetic flux.

It is normal to mount the brackets which hold the motor bearings directly upon the stator in order that the relationship between the stator bore and the bearing, and thus the rotor, can be closely controlled. This close control results in a more uniform and possibly smaller air-gap which enhances the performance of the motor.

The brackets are usually constructed with a protuberance, or boss, surrounding the hole through which the securing bolt or rivet is inserted. Since the size of the boss must be such as to contain not only the bolt or rivet, but also sufficient to contain bracket material to provide strength, it becomes necessary to make the mounting holes in the lamination larger than is required to merely clear the bolt or rivet. In a typical stator, the holes provided for mounting are 0.375-inch in diameter but contain a bolt with a diameter of only 0.164-inch.

The need to use such a relatively large hole through the stator may often cause the iron adjacent to these holes to become saturated with magnetic flux, thereby reducing the efficiency of the motor.

Since laminations are produced on progressive dies, it has been necessary to make the clearance holes in all laminations of this large diameter, even though the boss on the mounting bracket is engaged only with a small number of laminations on either end of the stator.

There is a need to make the mounting holes large enough to receive the parts inserted into them. If the stator is an inch thick, for example, it may mean that forty laminate pieces must be almost perfectly aligned. It has heretofore been too expensive to make some laminates with large holes and some with small holes because, during assembly, the two sizes of laminates had to be sorted and assembled in a proper order. Therefore, all forty laminates have had large holes.

There are two approaches to a solution of these and similar problems. First, one might reduce the need for oversize holes by a redesign of the parts which must fit into the holes. Second, there may be a more precise method of assembling the laminate plates when the stator is manufactured so that some laminates may be different from other laminates.

Accordingly, an object of this invention is to improve the efficiency of fractional horsepower motors without substantially increasing the cost thereof.

An object of this invention is to provide a means whereby the brackets may be securely and accurately located without the need to remove any more magnetic material than is needed to clear only the bolt.

Another object of this invention is to provide a more efficient distribution of magnetic flux in the stator of fractional horsepower motors.

Yet another object of the invention is to produce superior stators especially—although not exclusively—for fractional horsepower motors.

In keeping with an aspect of this invention, these and other objects are accomplished by providing a way of reducing the disruptive effect upon magnetic flux distribution which occurs as a result of large mounting holes in laminates of a stator. In one embodiment, the shape of the holes are changed to a configuration which has a minimum effect upon the flux distribution.

The preferred embodiments of the invention are shown in the attached drawings, wherein:

FIG. 1 is an exploded view, in perspective of a fractional horsepower

FIG. 2 illustrates flux distribution problems which have been encountered as a result of large mounting holes used in the prior art modes of the type shown in FIG. 1;

FIG. 3 shows a fragment of a motor bracket used in the prior art with the large holes of FIG. 2;

FIG. 4 schematically shows a manufacturing technique for assembling stator plates, which may be used to produce superior stators which may have smaller holes;

FIG. 5 is a cross section of a stator showing a fragment of an exemplary four laminate plates incorporating the invention;

FIG. 6 schematically illustrates a way of providing mounting holes in a stator with less disruption of the flux pattern in the stator; and FIG. 7 is a fragment of a motor bracket (similar to the fragment of FIG. 3) for use with the stator holes of FIG. 6.

A fractional horsepower motor (FIG. 1) has a laminated magnetic stator 20 with a coil assembly 22 mounted thereon. An exemplary seven laminates L1–L7 are here shown; however many more are usually provided, such as forty laminate plates in a stator which is one inch thick. A relatively large bore 24 extends through the stator to receive a rotor 26. The rotor 26 should be centered in bore 24 so that there is a uniform air gap surrounding it. Therefore, two motor bearing brackets 28, 30 are bolted on to opposite sides of the stator.

Each of these motor bearing brackets has a bearing 31 for receiving an end of shaft 32, 32 on rotor 26. The brackets are elongated members which include protrusions 34, 36 on opposite arms 38, 40 of the brackets. The protrusions fit into mounting holes 42, 44 which are oppositely disposed on either side of bore 24. The positions of the mounting holes 42, 44, relative to the location of bore 24, insure that the rotor 26 is properly positioned within bore with a proper air gap.

In order to mount the brackets 28, 30, the holes 42, 44 are made relatively large (0.375-inch diameter, in one example) to receive the protrusions 34, 36. Since brackets 28, 30 are usually made of aluminum or zinc, which does not carry magnetic flux, the protrusions do nothing for the flux problems. The large diameter of holes 42, 44 is required for mechanical strength since the protrusions 34, 36 must contain holes 54, 56 which are large enough to receive bolts 46 48 (0.164-inch diameter in the noted example). The bolts, which pass through holes 50–56 are made of steel and therefore do carry some flux; however, the beneficial effect of these bolts is minimal because they have a very small diameter compared to the holes 42, 44. Therefore, the flux F1 tends to be concentrated in areas A1, A2 of the stator 20 which are on opposite sides of the mounting holes 42, 44. This makes the stators relatively inefficient and might even cause a magnetic saturation of the stator which could cause the motor to fail.

According to the invention, more magnetic material is retained in the stator by either of two techniques, or by a combination of the two techniques.

A first technique is to construct the stator in a manner which insures substantially perfect assembly and alignment of the laminates and of the holes 42, 44. The laminates are made in a progressive die which produces an upstanding tang 58, 60, 62 (FIG. 4) on each laminate L1, L2, L3 . . . As each laminate completes its trip through the progressive die, it drops into an alignment chute. A counter counts the laminates as they enter the chute. When a predetermined number of the laminates are accumulated in the chute, the punch press exerts enough pressure upon them to cause the tangs 58–62 to interlock and clinch together in a manner which holds all laminates securely in place. The interlocking tangs tend to hold the laminates tighter and more predictably.

The exact number of laminates present and the locations of the individual laminates are known so that the outside two or three laminates on each side of the stator may be made in a different way without simultaneously creating an assembly problem requiring a sorting of the laminates.

As a result of the assembly of laminates within the chute, it is possible to have larger diameter holes in a selected number of laminates on each side of the stator and small diameter holes in the laminates at the center of the stator. Thus the previous need for large diameter holes extending entirely through the stator and the attendant loss of magnetic material is eliminated. With the described constructed and clinched laminate stator, the holes for receiving the protrusions may be made much more shallow. For example, as shown in FIG. 5 the large hole 64 only appears in the first two laminates L1, L2. The protrusion 66 has a length H which is substantially equal to the depth D of the hole 64. The remainder of the holes 68 in the laminates are only large enough to receive the bolt 70 which holds the assembly together. Thus, all of the laminates, except for the two outside laminates on either side, may carry more flux.

In order to make the laminates shown in FIG. 5, a progressive die first punches the small diameter holes 68 in each and every laminate. A counter counts to determine (1) how many laminates to clinch together and (2) which laminates require the larger hole 64. For example, if a stator has forty laminates, the counter causes the small hole 68 to be over punched to become a large hole 64 in the first, second, thirty-ninth and fortieth laminates. This over-punching is accomplished by a punch which is known as a "gagging" punch. The laminates numbered three through thirty-eight retain large amounts of flux carrying metal in the areas A1, A2, FIG. 2.

The solution of FIGS. 4, 5, requires the use of special dies for making the laminates, which is fine if the company making the motor has the necessary machine tools. However, many companies purchase the laminates from outside vendors who would not want to have special tools, dies and procedures for a single customer, who might want many different combinations of laminates for different sized motors.

Therefore, for this condition where all laminates should be identical, the embodiment of FIGS. 6, 7 may be used. Here, the shape of the holes 72, 74 are changed to have the diameter of a small bolt hole with key slots 76, 78 extending from opposite sides. The key slots 76, 78 lie in alignment with the direction of magnetic flux F2, as shown in FIG. 6. Since the key slots are relatively narrow in this direction of flux, they have only a negligible effect upon the total flux and do not cause an appreciable concentration of flux in the areas A3, A4, such as the concentration shown at A1, A2 in FIG. 2.

The motor bracket 80 (FIG. 7) for this embodiment has a relatively small protrusion 82, but it derives sufficient mechanical strength from oppositely disposed keys 84, 86 to enable it to serve its function.

A combination of the techniques of FIGS. 4–7 would lead to a hole in the shape 72–78 (FIG. 6) limited to two or three laminations on opposite sides of the stator.

Those who are skilled in the art will readily perceive how to modify the invention. Therefore, the appended claims are to be construed to cover all equivalent structures which fall within the true scope and spirit of the invention.

The claimed invention is:

1. A method of manufacturing laminated stators, especially for fractional horsepower motors, said method comprising the steps of:
    (a) stamping said laminates on a punch press, each of said laminates having a configuration which clinches them together when a stack of laminates are pressed together;
    (b) counting said laminates as they are produced,
    (c) altering the configuration of selected laminates in said stack in order to have large diameter bracket mounting holes on opposite sides of said stack of laminates and small diameter screw receiving holes in the remainder of said laminates;
    (d) assembling a counted number of said laminates into said stack as they are produced; and
    pressing the counted assembly of step (d) to clinch them together.

2. The method of claim 1 wherein step (a) comprises the further step of forming said laminates with upstanding tangs which nest together as they are assembled in step (d) and clinch together as they are pressed in step (e).

3. The method of claim 1 wherein the altering of step (c) comprises the further step of forming large mounting bracket receiving holes on a limited number of laminates on the opposite sides of said stator.

4. A method of manufacturing laminated stators comprising the steps of:
    (a) forming a plurality of identical stator laminates, each of said laminates having at least one relatively small diameter bolt hole formed therein, said small diameter hole being located at a place in said stator which improves magnetic flux distribution in said laminate;
    (b) identifying at least one of said laminates which will be assembled on an outside of a stack of laminates; and
    (c) over punching said small diameter bolt hole in said one laminate, said over punching making a larger diameter hole which facilitates an assembly of a motor using said laminate, without simultaneously increasing the diameter of the remainder of the bolt holes or disturbing said improved flux distribution in the remainder of said laminates.

5. The method of claim 4 wherein step (a) comprises forming in each laminate two key slots extending from opposite sides of said small diameter bolt holes, said key slots being aligned with flux lines in said laminate in order to provide said improved flux lines.

6. The method of claim 5 and the added step of accumulating a predetermined number of said laminates as they are formed, whereby a batch of laminates are assembled to form a completed stator, said one laminate being on an outside of said batch of laminates.

7. The method of claim 6 wherein step (b) includes the added step of submitting at least the first and last laminate in said accumulated batch for said over punching in step (c) whereby the outside laminates on both sides of said stator may receive in said over punched hole a member which has a diameter that is larger than the diameter of a bolt which may pass through said bolt holes.

8. The method of claim 6 wherein step (b) includes the added step of submitting at least the first two and last two laminates in said accumulated batch for said over punching in step (c) whereby the two outside laminates on each side of said stator may receive a member which has a diameter that is larger than the diameter of a bolt which may pass through said bolt holes.

9. The method of claim 6 wherein there is a chute into which said laminates are directed as they are formed in order to accumulate said batch of laminates and the added step of over punching at least the first and the last laminates directed into said chute at the start and the end of said accumulation of each batch of said stator.

10. A method of manufacturing laminated stators, especially for fractional horsepower motors, said method comprising the steps of:
   a) stamping said laminates on a punch press, said stamped laminates having small bolt holes;
   b) counting said laminates as they are produced in order to accumulate a batch of said laminates;
   c) altering the configuration of selected laminates in said batch in order to provide large diameter bracket mounting holes on opposite sides of a stator constructed from said laminate and small diameter bolt holes remaining in the rest of said laminates; and
   d) assembling said counted number of said laminates into said stator as they are produced.

11. The method of claim 10 wherein step (a) includes the further step of forming each of said laminates with a configuration which clinches them together when said batch of laminates are pressed together; and the added step of pressing together the batch of counted laminates which are accumulated in step (c) in order to clinch them together, there being at least two of said selected laminates with said large diameter holes on each side of said pressed together laminates.

12. The method of claim 11 wherein said configuration of said laminates comprises forming upstanding tangs which nest together as they are assembled in step (d), said upstanding tangs clinching together as they are pressed together in the added step.

* * * * *